March 18, 1952 W. P. SPAIN 2,590,051
CONFECTION MACHINE
Filed April 10, 1946 2 SHEETS—SHEET 1
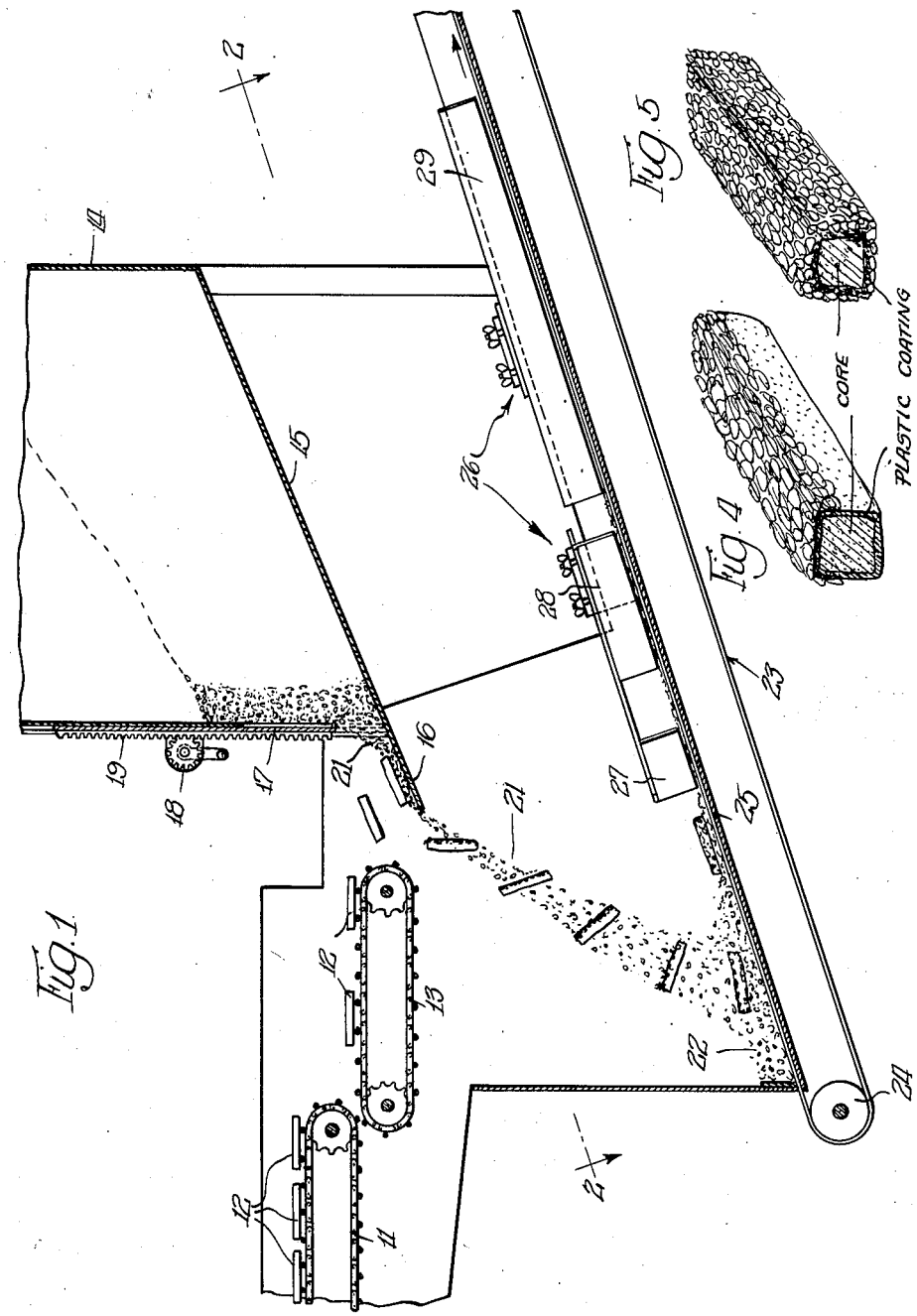
INVENTOR.
William P. Spain,
BY
Cromwell, Greist & Warden

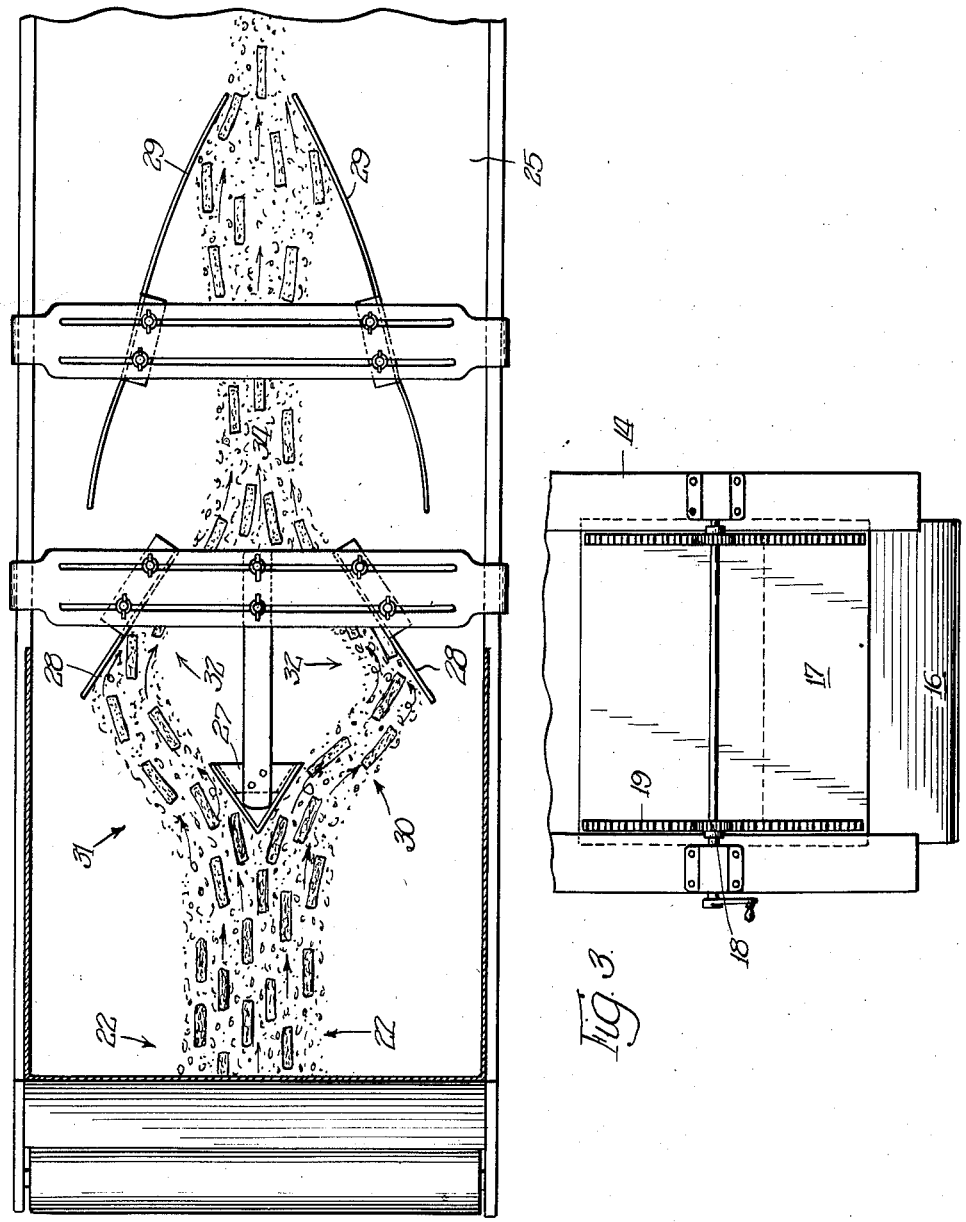

Patented Mar. 18, 1952

2,590,051

UNITED STATES PATENT OFFICE 2,590,051

CONFECTION MACHINE

William P. Spain, Villa Park, Ill., assignor to E. J. Brach & Sons, Chicago, Ill., a corporation of Illinois Application April 10, 1946, Serial No. 661,154

8 Claims. (Cl. 118—19)

This invention relates to improvements in a machine having to do with the manufacture of confections. In particular, it relates to a machine in which confection centers are coated with a plastic coating material and improved means for tumbling the confections through space in such a manner that the same are coated, first on one side and then on the other with relatively hard edible units, and then rolling the centers and units in a manner such that the units are more deeply embedded in the centers, and this is a principal object of the invention.

More specifically, the invention pertains to a machine for enrobing candy centers with a plastic coating and thereafter embedding relatively hard edible units within the coating, having particular reference to the improvement comprising means for deflecting a controlled stream of the units from a hopper in a predetermined direction through space to be accumulated in a mass upon a conveyor, means for feeding the centers into the stream of units against the first named means to embed the units into the coated centers on one side thereof and to permit them to fall with the stream of units into the mass to embed the units into the other side of the coated centers, and means to roll the coated centers with the edible units embedded therein in such a manner that they are more firmly secured in the coating.

Other objects of the invention will in part be obvious and will in part appear hereinafter.

The invention accordingly comprises the several steps and the relation of one or more of such steps with respect to each of the others, and the machine embodying features of construction, combinations of elements and arrangement of parts which are adapted to effect such steps, all as exemplified in the following detailed disclosure, and the scope of the application of which will be indicated in the claims.

For a fuller understanding of the nature and objects of the invention reference should be had to the following detailed description taken in connection with the accompanying drawings, in which:

Fig. 1 is a side elevational view taken through a portion of a machine having to do with the manufacture of confections, partly in section and with parts broken away, and illustrating a preferred embodiment of the invention;

Fig. 2 is a plan view of a portion of the machine depicted in Fig. 1 taken along the line 2—2 thereof and looking in the direction of the arrows;

Fig. 3 is an end view of a hopper or feeding device for feeding edible units, such as nuts into the machine;

Fig. 4 is a perspective view of a section of a center coated with a plastic material having nuts embedded along one surface thereof; and Fig. 5 is a perspective view of a section of a center coated with a plastic mass having nuts embedded completely around the coated surface thereof.

Referring more particularly to Fig. 1 of the drawings there is shown a bar conveyor 11 carrying a row of candy centers 12 which have been enrobed with a plastic mass such as caramel after passing through an enrobing device (not shown).

The conveyor 11 passes the candy centers 12 to another rod conveyor 13 traveling at an increased speed. The speed of the rod conveyor 13 preferably is about five times that of the conveyor 11 and is herein referred to as a center slinger or projecting conveyor.

A hopper, or feeding device, 14 containing edible units such as, for example, nut meats as peanuts, coconut, etc., hard candy pieces, or the like, is mounted in the path of the centers 12. The hopper has an inclined bottom 15 and a deflecting plate 16 associated therewith. The front of the hopper is provided with a gate 17 which may be raised and lowered by a hand wheel 18 meshed with a rack bar 19. This arrangement controls the flow of the edible units along the upper surface of the deflecting plate 16.

At this point it should be noted that the centers 12 are thrown from the slinger or projecting conveyor 13 in such a manner against the deflecting plate 16 into the stream of edible units 21 so that the centers are coated along one side (see Fig. 4). Thereupon they are carried by the stream of units in a direction counter to their original direction of travel and in doing so are tumbled at least once to fall into an accumulated mass 22 of units so that the other surface of the centers are also covered with nuts because the plastic coating is still in sufficiently tacky condition to cause the units to adhere thereto (see Fig. 5).

The accumulated mass is constantly shifting as it falls upon an endless conveyor belt 23, preferably traveling at an incline around rollers 24, one only of which is shown in the drawings. The upper flight of the conveyor 23 preferably is supported by a bed plate 25.

Disposed above the upper flight of the conveyor 23 are means indicated generally at 26 for rolling the centers in such a manner that the units are more evenly, deeply, and firmly embedded in the plastic coating surrounding the same.

Referring now to Fig. 2, the rolling and embedding action is more particularly depicted. The means for performing these functions preferably comprises a plough member 27 and rearwardly and laterally disposed baffle members 28, 28. Supplemental baffle members 29, 29 preferably are also employed and the function of the plough and baffle members will now be described.

As the coated centers containing the embedded units are accumulated in the mass 22 at the bottom of the conveyor, they are carried against the plough 27. The combined mass of edible units and the coated centers containing embedded units are separated into at least two rows, indicated generally at 30 and 31, by means of the plough. As the units and the coated centers are intermingled with each other they are rolled in a direction as indicated by the arrows in each stream or rows 30 and 31. In other words, the coated centers in the same row are rolled in the same direction, but in opposite directions from each other in the separate rows. Because of the pressure of all of the bodies against each other in each row, the units already embedded within the centers are more deeply pressed therein and the rolling action imparted to each center enhances the embedding of the units.

As the conveyor continues to carry the centers and units beyond the plough, the two rows 30 and 31 strike the baffle members 28, 28, whereupon the centers with the units embedded therein are plowed over or rolled in an opposite direction and toward each other as indicated generally at 32 and 33. Thereafter, the separated rows are once again combined into a single row 34 and the centers are continuously carried along in a steady stream emanating from between the baffle members 29, 29. By this time the relatively hard edible units are satisfactorily embedded within the plastic coating surrounding the confection centers. Thereafter the centers may be subjected to further treatment such as, for example, passing them through a chocolate enrobing machine.

By "plastic coating" is meant any coating such as caramel, chocolate, taffy, etc., which would be satisfactory for the purpose described.

By the term "relatively hard edible units" is meant, in addition to nut meats and candy pieces heretofore enumerated, such materials as various types of cereals and the like, or any other suitable material which it may be desired to affix into a plastic coating surrounding a candy center.

While there has been disclosed in the drawings elongated centers having nuts embedded in a plastic coating surrounding the same to illustrate the function of rolling conventional nut bars it should be understood that the invention contemplates the treatment of candy pieces not limited to any particular shape or size.

Since certain changes in the constructions set forth, which embody the invention may be made without departing from its scope, it is intended that all matter contained in the above description, or shown in the accompanying drawings, shall be interpreted as illustrative and not in a limiting sense.

It is also to be understood that the following claims are intended to cover all of the generic and specific features of the invention herein described, and all statements of the scope of the invention which, as a matter of language, might be said to fall therebetween.

Having described my invention, what I claim as new and desire to secure by Letters Patent, is:

1. In a machine for enrobing confection centers with a plastic coating and thereafter embedding relatively hard edible units within said coating, the combination comprising means for feeding a controlled stream of said units, means including a fixed surface arranged at a downward inclination from said feeding means for deflecting said stream of units laterally beneath said feeding means, conveyor means spaced a substantial distance beneath said feeding means, means for feeding coated centers into said stream of units against said inclined surface to embed said units in the surface of said coated centers and fall by gravity with said stream of units to said conveyor, said units and said coated centers being temporarily accumulated in a mass upon said conveyor whereby to embed additional units in the surfaces of said coated centers, and means mounted along said conveyor to separate said mass of units and said centers containing embedded units into divergent paths whereby to roll the centers in the diverged mass of units as they are carried along by said conveyor.

2. In a confection making machine, a supply hopper and means including a supporting plate inclined downwardly away from said hopper for delivering into the space below the same a controlled stream of relatively small edible confection units, means for delivering plastic coated confection centers onto said inclined supporting plate and into said controlled stream of units to embed in the surface thereof a plurality of said units, a conveyor beneath said supply hopper for receiving in an accumulated mass the stream of units and centers, said conveyor carrying said centers and said units away from beneath said supply hopper, means cooperating with said conveyor to divide said units and said centers into two diverging streams and other means associated with said conveyor for rolling the centers and units in the separate streams toward each other to embed additional units in said centers.

3. In a confection making machine as recited in claim 2, said conveyor being arranged at an upwardly inclined angle to carry said units and the centers delivered thereto upwardly toward said dividing and rolling means.

4. In a machine for enrobing confection centers with a plastic coating and thereafter embedding edible units in said coating, a supply hopper having a discharge opening, a fixed surface extending at an inclination downwardly away from said discharge opening for delivering into the space below said hopper a controlled stream of said units, an endless conveyor spaced a substantial distance beneath said supply hopper for receiving at one end thereof in an accumulated mass said stream of units, means for delivering coated confection centers into said controlled stream of units immediately adjacent said discharge opening to embed in the surface thereof a plurality of said units, said conveyor receiving the units and centers in freely falling relation thereon and carrying the units and centers away from beneath said supply hopper, plow means mounted above said conveyor dividing the units and centers into two diverging streams and converging guides mounted in spaced relation to said plow means above said conveyor directing said streams into converging relation to roll the centers and units in the separate streams toward each other and embed additional units in said centers.

5. In a machine for enrobing confection centers with a plastic coating and thereafter embedding relatively hard edible units in said coating wherein there is provided a hopper having means for feeding a controlled stream of said units into the space below the same and means adjacent said hopper for feeding successive coated centers into said stream of units, a conveyor spaced a substantial distance below said hopped for receiving said units and said centers in freely falling relation thereon, said conveyor extending at an angle upwardly relative to the hopper and means cooperating with said conveyor to separate into diverging streams said units and said centers received thereon and to roll said centers in said units.

6. In a machine for enrobing confection centers with a plastic coating and thereafter embedding relatively hard edible units in said coating, the combination comprising a hopper for receiving a supply of said units, said hopper having a discharge opening, a deflecting surface extending at a downward and outward inclination therefrom for feeding a controlled stream of said units into the space below the same, a conveyor spaced a substantial distance below said inclined surface for receiving said units and said centers in freely falling relation thereon and for carrying the same in a direction generally opposite the direction of the stream of units, means adjacent the discharge opening of said hopper for feeding successive coated centers against said deflecting surface, and means cooperating with said conveyor to first separate into diverging streams the units and the centers received thereon and thereafter to roll said centers in said units.

7. In a machine for enrobing confection centers with a plastic coating and thereafter embedding relatively hard edible units in said coating, which is characterized by a hopper for receiving a supply of said units, said hopper having a discharge opening for feeding a controlled stream of said units into the space below the same and a deflecting plate below said discharge opening to deflect the stream of units into the space below the hopper away from said hopper, and means adjacent the discharge opening of said hopper for feeding successive coated centers into said deflected stream of units, a conveyor arranged below said deflecting plate for receiving the units and centers in freely falling relation thereon, said conveyor extending at an upward angle relative to said hopper and in a direction generally opposite to the direction of the deflected stream of units, plow means arranged along said conveyor to separate into diverging streams the units and the centers received thereon and guide means spaced from said plow means to urge said diverging streams toward each other whereby to roll said centers in said units.

8. In a confection making machine which is characterized by a supply hopper, means for delivering into the space below the same a controlled stream of relatively small edible confection units and means for delivering plastic coated confection centers into said controlled stream of units to embed in the surface thereof a plurality of said units, the improvement which comprises a conveyor beneath the supply hopper for receiving in an accumulated mass the stream of units, said conveyor carrying the centers and the units away from beneath said supply hopper, means cooperating with said conveyor to divide said units and said centers into two diverging streams and other means associated with said conveyor for rolling the centers and units in the separate streams toward each other to embed additional units in said centers.

WILLIAM P. SPAIN.

REFERENCES CITED

The following references are of record in the file of this patent:

UNITED STATES PATENTS

| Number | Name | Date |
| --- | --- | --- |
| 1,473,289 | Green | Nov. 6, 1923 |
| 2,300,396 | Bookidis | Nov. 3, 1942 |
| 2,347,164 | Petrilli | Apr. 18, 1944 |
| 2,365,349 | MacManus | Dec. 19, 1944 |